P. LALLEMENT.
VELOCIPEDE.
No. 59,915.
Patented Nov. 20, 1866.
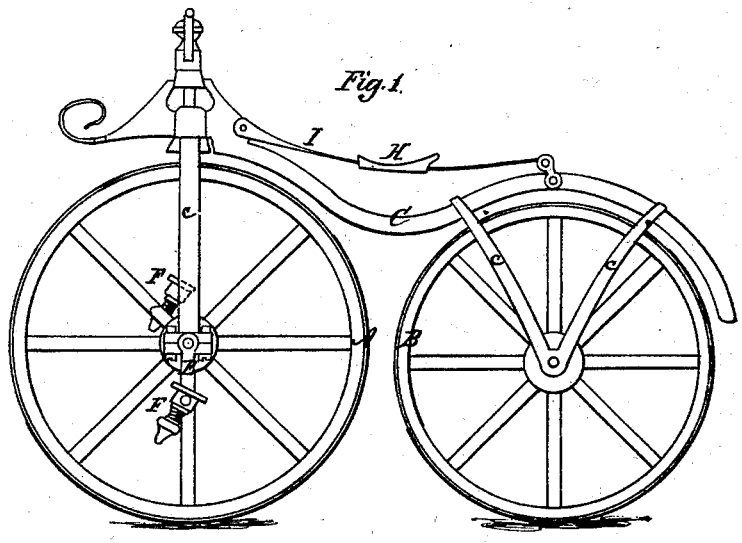
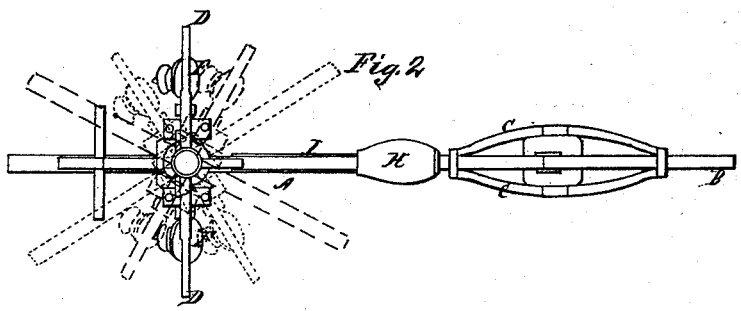
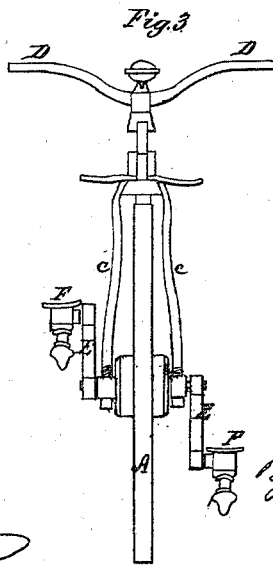

United States Patent Office.

PIERRE LALLEMENT, OF PARIS, FRANCE, ASSIGNOR TO HIMSELF AND JAMES CARROLL, OF NEW HAVEN, CONNECTICUT.

Letters Patent No. 59,915, dated Nove

IMPROVEMENT IN VELOCIPEDES.

The Schedule referred to in these Letters Patent and making part of the same

*To all whom it may concern:*

Be it known that I, PIERRE LALLEMENT, of Paris, temporarily residing at New Haven, in the county of New Haven, and State of Connecticut, have invented a new Improvement in Velocipedes; and I do hereby declare the following, when taken in connection with the accompanying drawings, and the letters of reference marked thereon, to be a full, clear, and exact description of the same, and which said drawings constitute part of this specification, and represent, in—

Figure 1, side view,
Figure 2, top view, and in
Figure 3, a front end view.

My invention consists in the arrangement of two wheels, the one directly in front of the other, combined with a mechanism for driving the wheels, and an arrangement for guiding; which arrangement also enables the rider to balance himself upon the two wheels.

To enable others to construct and operate my velocipede, I will proceed to describe the same, as illustrated in the accompanying drawings.

A and B are two wheels of common construction, each arranged upon separate axles, and placed, one directly in front of the other, as seen in figs. 1 and 2, the two connected together by a bar, C, passing over the two, as seen in fig. 1, with arms, c, extending down and supported on the axles of each wheel, as seen in fig. 3.

The arms of the forward wheel, A, are arranged upon a pivot on the bar C, so that, by means of handles, D D, the forward wheel may be turned to the right or left, as denoted in red and blue, fig. 2.

To the axle of the forward wheel A, I fix cranks E, to each of which I also fix a rocking-treadle, F, the same treadle being balanced by an extension below the crank-pin, so that the flat surface, as seen in fig. 3, will always be uppermost.

Above the bar C, and attached thereto in any convenient manner, I arrange a saddle-seat, H, upon a spring, I, as seen in figs. 1 and 2.

It is evident that, if left to its natural inclination, this carriage could not be made to stand upright. I will, therefore, proceed to describe how the carriage is put in motion, and, when in motion, an upright position maintained.

The rider, first setting the carriage upright, as in figs. 1 and 3, seats himself upon the saddle, in like manner as upon other carriages of this character, giving a forward movement to the carriage, either by his feet in contact with the earth or otherwise, immediately placing his feet, each, upon one of the treadles F, and each hand upon one of the guiding-arms, D, by his feet causing the forward wheel A to revolve, and by the hands guiding the carriage and maintaining his upright position.

If the carriage is inclined to lean to the right, turn the wheel as denoted in red, which throws the carriage over to the left; or, if inclined to the left, turn the wheel as denoted in blue.

Thus the carriage is maintained in an upright position, and driven with great velocity by means of the cranks in the forward wheel.

The greater the velocity, the more easily the upright position is maintained.

To turn the carriage either to the right or left, turn the guiding-wheel accordingly.

By this construction of a velocipede, after a little practice the rider is enabled to drive the same at an incredible velocity, with the greatest ease.

Having, therefore, thus fully described my invention, What I claim as new and useful, and desire to secure by Letters Patent, is—

The combination and arrangement of the two wheels, A and B, provided with the treadles F, and the guiding-arms D, so as to operate substantially as and for the purpose herein set forth.

PIERRE LALLEMENT.

Witnesses:
JOHN E. EARL,
ALTSIE J. TIBBITS.